United States Patent [19]

Shimizu

[11] 3,735,743
[45] May 29, 1973

[54] APPARATUS FOR ADJUSTING THE IGNITION TIMING FOR USE IN INTERNAL COMBUSTION ENGINES

[75] Inventor: Takeo Shimizu, Kyoto, Japan

[73] Assignee: Mitsubishi Jidosha Kogyo Kabushiki Kaisha, Tokyo, Japan

[22] Filed: Dec. 21, 1970

[21] Appl. No.: 99,740

[30] Foreign Application Priority Data

Dec. 24, 1969 Japan ..................44/103421

[52] U.S. Cl. ..................................123/117 A
[51] Int. Cl. ...................................F02p 5/04
[58] Field of Search ..............123/117 A, 146.5 A, 123/117 R, 117

[56] References Cited

UNITED STATES PATENTS

| | | | |
|---|---|---|---|
| 3,599,614 | 8/1971 | Kittredge | 123/117 A |
| 3,572,301 | 3/1971 | Kalippke | 123/117 A |
| 3,272,191 | 9/1966 | Walker | 123/117 A |
| 2,827,889 | 3/1958 | Smitley | 123/117 A |
| 3,431,897 | 3/1969 | Eltinge | 123/117 A |
| 2,377,566 | 6/1945 | Mallory | 123/117 A |
| 2,392,680 | 1/1946 | Mallory | 123/117 A |
| 3,007,987 | 11/1961 | Barnes | 123/117 A |
| 3,234,929 | 2/1966 | Sarg | 123/146.5 A |
| 3,326,197 | 6/1967 | Elkins | 123/117 A |
| 3,596,644 | 8/1971 | Hutchins | 123/117 A |
| 3,606,871 | 9/1971 | Gropp et al | 123/117 A |

*Primary Examiner*—Laurence M. Goodridge
*Assistant Examiner*—Cort Flint
*Attorney*—Bosworth, Sessions, Herrstrom & Cain

[57] ABSTRACT

An apparatus for adjusting the ignition timing for use in internal combustion engines having a conventional vacuum ignition advancer, the apparatus retarding or slowing down the action of said vacuum ignition advancer upon the occurrence of the negative pressure at the throttle valve of the carburetor, thereby giving hysteresis loop characteristics in the negative pressure-ignition timing relation.

1 Claim, 4 Drawing Figures

INVENTOR.
TAKEO SHIMIZU
BY Bosworth, Sessions
Herrstrom & Cain
ATTORNEYS

APPARATUS FOR ADJUSTING THE IGNITION TIMING FOR USE IN INTERNAL COMBUSTION ENGINES

BACKGROUND OF THE INVENTION

This invention relates to an improvement in or relating to an apparatus for controlling the ignition timing of internal combustion engines, particularly gasoline engines.

Recently the nitrogen oxide content (hereinafter referred to as $NO_x$ for simplicity) of exhaust emissions from automobiles has become such an important source of atmospheric pollution that automobile manufactures are being forced in some states of the United States to control the $NO_x$ emissions from their new models of 1971. Publications have disclosed that retarded ignition timing for an engine is very effective in combatting the problem of polutant emission. However, such methods have common shortcomings in that they reduce the engine power and increase the fuel consumption.

SUMMARY OF THE INVENTION

In view of the foregoing, the present invention has for its object the provision of an ignition timing adjusting apparatus of hysteresis loop type, which operates in such a manner that, when the engine is accelerated with an increased $NO_x$ emission, the ignition timing is temporarily retarded so as to reduce the $NO_x$ discharge and, when the engine is running normally at a cruising speed, the usual timing is maintained thereby to minimize the losses of output power and fuel consumption.

Usually an ignition adjusting mechanism consists of a centrifugal advancer incorporated in a distributor for the engine, and a vacuum ignition advancer. The former advances the ignition timing as the engine speed increases and the latter advances or retards the ignition timing as the load on the engine reduces or increases, respectively. These controls function in response to the engine speed and load, invole practically no time lag in controlling the ignition timing.

The present invention operates to retard or slow down the function of the vacuum ignition advancer. According to the invention, the response on the retarding side of the vacuum timing advancer is as quick as usual but the response on the advancing side is retarded. With such arrangement the ignition timing is retarded during the period of transitional driving when acceleration and deceleration are repeated, whereas the same timing as by a conventional device is maintained while the vehicle is running normally.

BRIEF DESCRIPTION OF THE DRAWING

Embodiments of the present invention will be described hereunder with reference to the accompanying drawings, wherein.

DESCRIPTION OF THE PREFERRED EMBODIMENTS

Figure 1:
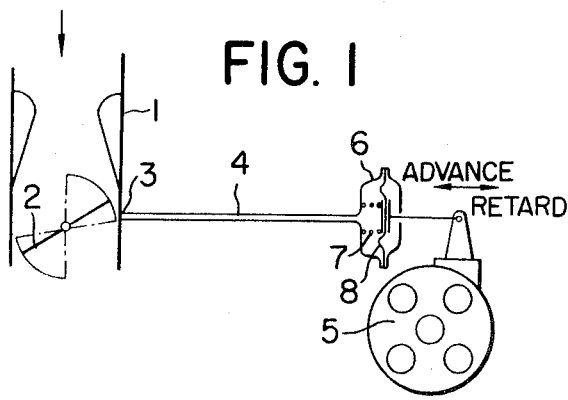
FIG. 1 is a schematic view of a conventional ignition timing adjusting mechanism for a gasoline engine.

FIG. 1 shows a conventional ignition timing adjusting device having a usual vacuum ignition advancer 6 which comprises a diaphragm 8 and a spring 7. A reference numeral 1 indicates a carburetor having a throttle valve 2. At the neighbourhood of the throttle valve 2, there is a negative pressure port 3 which is connected to one end of a negative pressure pipe 4 the other end of which is connected to the vacuum ignition advancer 6. The other side of the vacuum ignition advancer 6 is linked to a distributor 5.

When the opining of the throttle valve 2 is small, or when the load is light, the negative pressure downstream of the throttle valve 2 becomes high enough to be transmitted through the negative pressure port 3 and the pipe 4 to the vacuum ignition advancer 6, so that the diaphragm 8 is urged leftwards against the spring 7 and the ignition timing is advanced. Conversely when the throttle valve opening is large, the above procedure is reversed to retard the ignition timing. Thus the lighter the load on the engine with the slower combustion rate, the earlier the timing for ignition, and a best fuel-burning efficiency is ensured at all times.

Figure 2:
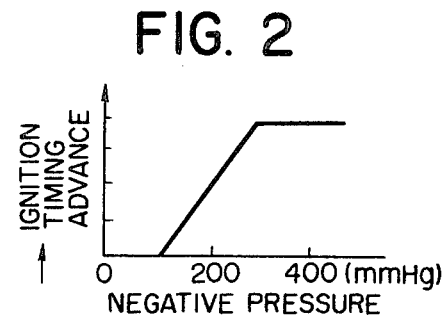
FIG. 2 is a graph showing the ignition advancing characteristic of the mechanism shown in FIG. 1.

FIG. 2 illustrates an example of the ignition advancing characteristic of the device shown in FIG. 1. The advance of ignition timing is plotted on the ordinate against the negative pressure in terms of the length of mercury column on the abscissa.

On most of the automotive engines in use, in order to ensure their stability during idling, the negative pressure port 3 is provided slightly upstream of the fully closed position of the throttle valve 2 lest any vacuum advancing should be accomplished while the throttle valve 2 is fully closed. With the apparatus of the present invention, for example, when the throttle valve 2 is suddenly opened from the fully closed position (for acceleration), the ignition timing is delayed a certain period of time behind the timing by the conventional device.

Figure 3:
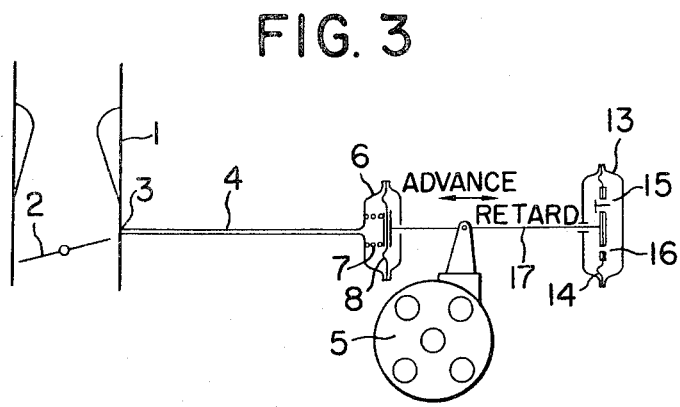
FIG. 3 is a schematic view of an embodiment of this invention.

FIG. 3 shows a preferred embodiment of this invention by which the desired mode of operation is attained. In this figure the members 1 to 8 are comparable to those of like reference numerals in FIG. 1. Additional members are shown, i.e., a dash pot assembly 13, a diaphragm 14, a one-way valve 15 with a leak hole 16, and a link 17. By the combined action of the diaphragm 14, the one-way valve 15, and the leak hole 16, the dash pot assembly 13 is moved slowly when it is urged leftwards (in the advancing direction) and quickly when it is urged rightwards (in the retarding direction).

Figure 4:
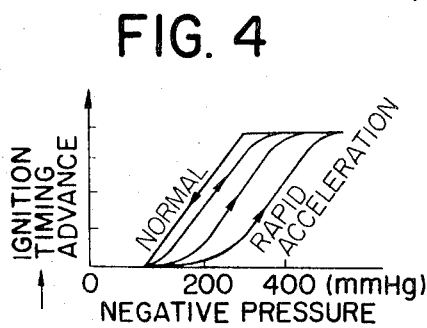
FIG. 4 is a graph showing the ignition advancing characteristic of the apparatus according to the invention.

In FIG. 4 there is shown the characteristic of the apparatus according to this invention, indicating that the ignition timing is delayed when the engine is accelerated from the state where the throttle is fully closed, or from a low speed.

Once a normal run is attained, however, the advance of the ignition timing is established in much the same way as by the conventional device.

Usually, as stated above, the $NO_x$ emission during a normal run is increased by acceleration with an increase in the load on the engine, and, if the ignition timing is retarded, the combustion temperature is lowered and hence the $NO_x$ production can be sharply reduced. However, constant retardation of the ignition timing would unfavorably affect the combustion efficiency and increase the losses of output power and fuel consumption. With the vacuum ignition advancer according to the invention, the timing is retarded temporarily at the time of acceleration so that the $NO_x$ emission is reduced stopped and, moreover, the portions of the power ouput and fuel consumption which may otherwise be lost during the normal run are advantageously reduced to zero.

The present invention may be embodied in other forms without departing from the spirit and essential characteristics thereof, therefore, the present embodiment is to be considered in all respects as illustrative only and not restrictive, the scope of the invention being indicated by the appended claims rather than by the foregoing description.

What is claimed is:

1. Apparatus for adjusting the ignition timing of an internal combustion engine having a vacuum ignition timing advancer that is mechanically operatively connected to an element of the distributor of the engine, comprising a separately housed dash pot provided with a diaphragm having a one-way valve and a leak hole therein; mechanically operatively connected to the said element of the distributor by a mechanical linkage assembly for opposing the action of the vacuum ignition advancer in the advancing direction while not opposing the operation of the vacuum ignition advancer in the retarding direction.

* * * * *